United States Patent [19]

Shaw

[11] Patent Number: 5,648,827

[45] Date of Patent: Jul. 15, 1997

[54] BACKLIGHTING SYSTEM FOR LIQUID CRYSTAL DISPLAYS HAVING A NON-PLANAR FLUORESCENT LAMP

[75] Inventor: James E. Shaw, Cedar Rapids, Iowa

[73] Assignee: Rockwell International Corporation, Seal Beach, Calif.

[21] Appl. No.: 493,759

[22] Filed: Jun. 22, 1995

[51] Int. Cl.$^6$ .................. G02F 1/1335; G01D 11/28; F21S 5/00
[52] U.S. Cl. ................. 349/61; 349/64; 349/70; 362/23; 362/29; 362/216
[58] Field of Search ................. 362/29, 31, 216, 362/260, 23; 359/48, 49, 50, 69; 349/61, 64, 70

[56] References Cited

U.S. PATENT DOCUMENTS

| | | | |
|---|---|---|---|
| 4,950,053 | 8/1990 | Haim et al. | 359/50 |
| 5,039,207 | 8/1991 | Green | 359/50 |
| 5,128,783 | 7/1992 | Abileah et al. | 359/49 |
| 5,220,249 | 6/1993 | Tsukada | 315/169.3 |

FOREIGN PATENT DOCUMENTS

| | | | |
|---|---|---|---|
| 1-302224 | 12/1989 | Japan | 359/50 |
| 2-215002 | 8/1990 | Japan | 362/260 |

*Primary Examiner*—William L. Sikes
*Assistant Examiner*—Walter J. Malinowski
*Attorney, Agent, or Firm*—John D. Veldhuis-Kroeze; M. Lee Murrah; George A. Montanye

[57] ABSTRACT

A liquid crystal display is provided which has improved wide angle viewing characteristics. The liquid crystal display includes a liquid crystal matrix. A non-planar fluorescent lamp positioned on a first side of the liquid crystal matrix has a center which traverses the fluorescent lamp in at least one longitudinal direction. A distance between the first side of the liquid crystal matrix and the fluorescent lamp center in a first portion of the fluorescent lamp is less than a distance between the first side of the liquid crystal matrix and the fluorescent lamp center in a second portion of the fluorescent lamp.

7 Claims, 6 Drawing Sheets

BACKLIGHTING SYSTEM FOR LIQUID CRYSTAL DISPLAYS HAVING A NON-PLANAR FLUORESCENT LAMP

BACKGROUND OF THE INVENTION

The present invention relates generally to liquid crystal displays, and more particularly, to systems for backlighting liquid crystal displays.

The principal of operation of liquid crystal displays (LCDs) is well known in the art, but for purposes of understanding the present invention, it can be stated that LCDs operate by reducing the transmissibility of light through a thin layer of liquid crystalline (LC) material when an electric field is applied. Because LCDs are not self-illuminating, backlighting of the LC matrix is required for an LCD to be viewed. Typically, backlighting is accomplished with one or more fluorescent lamps or lamp sections located in a luminaire cavity behind the LC matrix. A diffuser is also typically located between the LC matrix and the lamp sections in order to blend the light and/or to facilitate viewing of the LCD from a variety of angles.

Current backlighting systems introduce a number of luminance related problems. For example, LCDs using current backlighting systems suffer from non-uniformity in the region near the edge of the display. Edge, surfaces, typically the LCD frame, tend to scatter and/or absorb luminance energy. This creates a dark region or area of low luminance near the edge of the display. As the viewing angle increases, the luminance decrease near the edges of the display becomes more significant. In some applications such as in avionics displays, this "edge effect" or "luminance roll-off" is unacceptable. Low mean luminance of the display is another related problem with existing LCDs.

Frequently, manufacturers of LCD backlighting systems move the lamps back from the LC matrix and the diffuser in order to blend the luminous flux coming off of the lamps so that viewers cannot see the contour of the lamp. However, increasing this distance further exasperates the above described luminance problems. Consequently, a need exists for an improved LCD backlighting system which eliminates or minimizes luminance related problems such as luminance roll-off, low mean luminance and poor luminance uniformity. The present invention discloses a variety of embodiments of such an LCD backlighting system.

SUMMARY OF THE INVENTION

It is an object of the present invention to provide an LCD having optimized viewing angle characteristics. It is a second object of the present invention to provide an LCD backlighting system which minimizes the phenomenon known as edge effect or luminance roll-off. It is a third object of the present invention to provide an LCD backlighting system which optimizes the mean luminance of the display. It is a fourth object of the present invention to provide an LCD backlighting system which achieves high luminance uniformity across the display. The present invention achieves these objects and others discussed throughout this application.

According to the present invention, a liquid crystal display is provided which has improved wide angle viewing characteristics. The liquid crystal display includes a liquid crystal matrix. A non-planar fluorescent lamp positioned on a first side of the liquid crystal matrix has a center which traverses the fluorescent lamp in at least one longitudinal direction. A distance between the first side of the liquid crystal matrix and the fluorescent lamp center in a first portion of the fluorescent lamp is less than a distance between the first side of the liquid crystal matrix and the fluorescent lamp center in a second portion of the fluorescent lamp.

BRIEF DESCRIPTION OF THE DRAWINGS

The invention may be more fully understood by reading the following description of preferred embodiments of the invention in conjunction with the appended drawings wherein.

DETAILED DESCRIPTION OF THE PREFERRED EMBODIMENTS

The present invention is an LCD having a luminaire or backlighting system which utilizes a non-conventional fluorescent lamp shape to optimize the viewing angle characteristics of the display. The fluorescent lamp of the present invention is contoured such that certain sections of the lamp are positioned closer to the LC matrix or optical stack of the LCD than are other sections of the lamp. In some preferred embodiments, outer sections or legs of the lamp are extended forward closer to the optical stack than are the center legs. The result is that edge effect is minimized and more of the lamp's energy can be seen when viewing the LCD from off axis viewing angles. Luminance uniformity and mean luminance of the LCD are also optimized. A contoured diffuser and/or a contoured reflector can also be used with the non-planar grid lamp to further aid in minimizing luminance roll-off and optimizing the viewing characteristics of an LCD.

Figure 1:
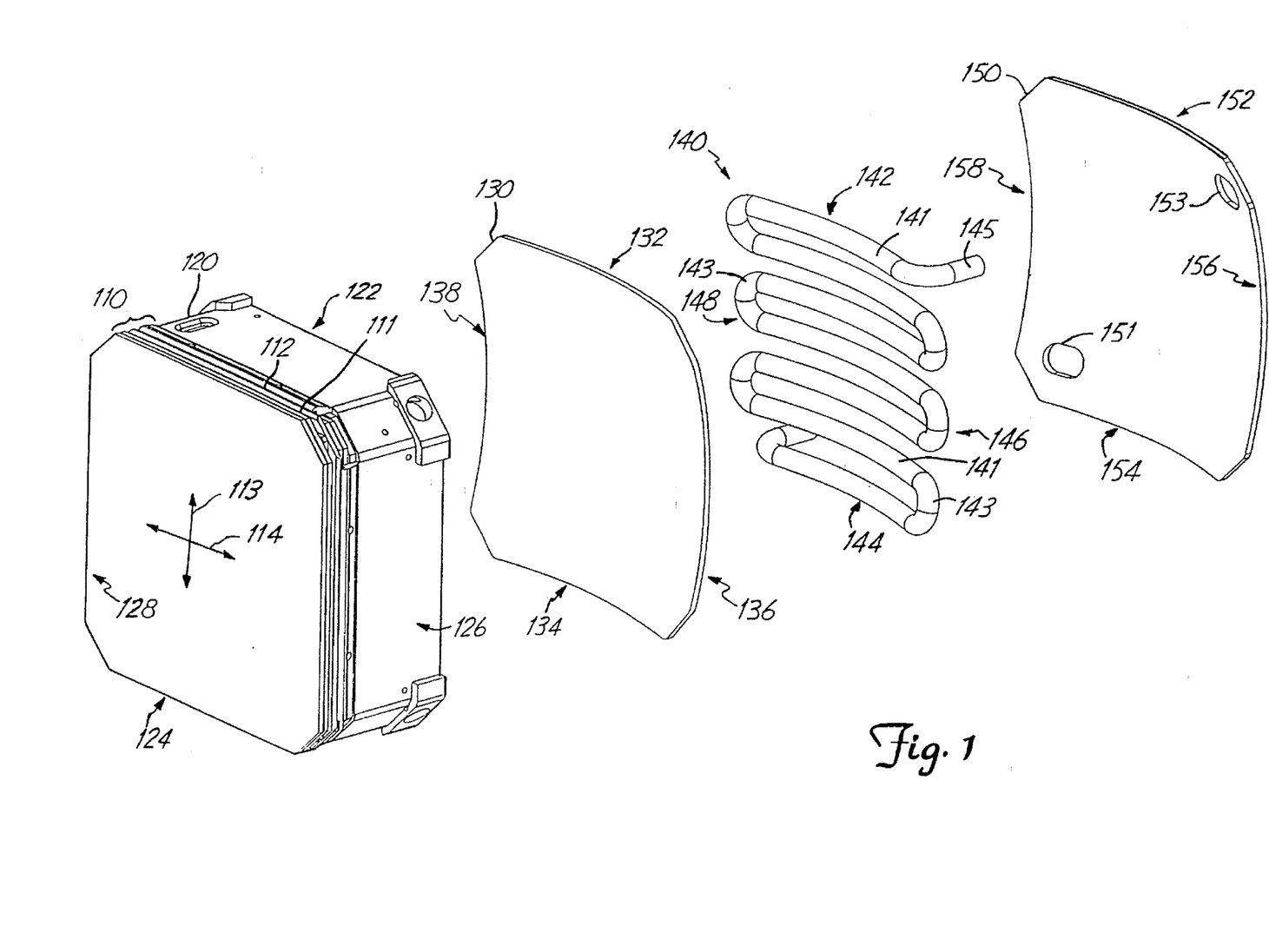
FIG. 1 is a diagrammatic view in perspective of an LCD having a luminaire with a non-planar fluorescent lamp, a non-planar diffuser and a non-planar reflector according to a first preferred embodiment of the present invention.

FIG. 1 is a diagrammatic view in perspective of an LCD having an improved backlighting system according to first preferred embodiments of the present invention. LCD 100 includes optical stack 110, luminaire cavity or frame 120, non-planar or contoured diffuser 130, contoured grid lamp 140, and contoured reflector 150. Optical stack 110 includes LC matrix 111 having backplane 112. Typically, optical stack 110 also includes other optical components such as filters, polarizers and compensators. Optical stack 110 is secured to frame 120 by any conventional manner. In the preferred embodiment shown, optical stack 110 and frame 120 have four sides—first side 122, second side 124, third side 126, and fourth side 128. Also, two perpendicular axis or directions 113 and 114 are illustrated on the face of optical stack 110 to aid in the description of preferred embodiments of the present invention.

Contoured diffuser 130 is a diffuser similar to the type well known in the art. Diffuser 130 can be coupled to frame 120 by any conventional manner including the manner illustrated in and discussed later with reference to FIG. 4. Like conventional diffusers, contoured diffuser 130 has four sides—first side 132, second side 134, third side 136 and fourth side 138. However, contoured diffuser 130 differs from conventional "planar" diffusers in that it is curved in two directions. As shown, diffuser 130 has a curvature along direction 113 between sides 132 and 134 such that these sides are positioned closer to optical stack 110 than is the center portion of the diffuser. Likewise, diffuser 130 has a curvature along direction 114 between sides 136 and 138 such that these sides are positioned closer to optical stack 110 than is the center portion of the diffuser. Preferably, contoured diffuser 130 is fabricated using conventional molding techniques for acrylic or polycarbonate materials.

Contoured grid lamp 140 is preferably a serpentine fluorescent lamp similar to those currently used in the art. Lamp 140 includes longitudinally extending sections 141 joined by end sections or junctions 143. A center of the generally tubular lamp sections extends longitudinally throughout lamp 140. Vertical or horizontal orientation of sections 141 is application dependent. Portions 145 of lamp 140 are not used for illuminating the display, but rather, they are oriented substantially perpendicular to optical stack 110 and are used to secure in place and supply power to lamp 140. Lamp 140 has four sides—first side 142, second side 144, third side 146 and fourth side 148. Lamp 140 differs from conventional "planar" grid lamps in that it is curved in two directions. As shown, lamp 140 has a curvature along direction 113 between sides 142 and 144 such that portions of the lamp on these sides are positioned closer to optical stack 110 than are more centrally located portions of the lamp. Likewise, lamp 140 has a curvature along direction 114 between sides 146 and 148 such that portions of the lamp on these sides are positioned closer to optical stack 110 than are centrally located portions of the lamp. Stated another way, the edges or corners of certain portions of lamp 140 are closer to optical stack 110 than are the edges of other portions of lamp 140.

Lamp 140 can be fabricated in a number of different manners. In the preferred manner, lamp 140 is bent or formed into a conventional "planar" serpentine configuration. Then, lamp 140 is re-heated over a surface having the appropriate curvatures and allowed to sag to achieve the curvatures of the surface. In the alternative, lamp 140 can also be conventionally formed and then subsequently re-heated and bent over a mandrel.

Contoured reflector 150 is preferably a reflector similar to those currently used in the art. Reflector 150 includes apertures 151 and 153 for receiving portions 145 of lamp 140 so that lamp 140 can be secured in place and supplied power. Reflector 150 has four sides—first side 152, second side 154, third side 156 and fourth side 158. Reflector 150 differs from conventional planar reflectors in that it is curved in two directions. As shown, reflector 140 has a curvature along direction 113 between sides 152 and 154 such that these sides of the reflector are positioned closer to optical stack 110 than is the center portion of the reflector. Likewise, reflector 150 has a curvature along direction 114 between sides 156 and 158 such that these sides of the reflector are positioned closer to optical stack 110 than is the center portion of the reflector.

Many prior art reflectors have "curvatures" in the sense that individual sections of their surface are designed to curve or wrap around specific individual lamp sections to better reflect the light from that lamp section into a desired direction. However, these reflectors are not "non-planar" in the sense referred to with regards to the present invention because outer portions of these reflectors are not curved so as to be positioned closer to the optical stack than more centrally located portions of the reflector. Contoured reflector 150 can be altered slightly to include these contoured sub-sections while maintaining overall curvatures as described above in directions 113 and 114.

Figure 2:
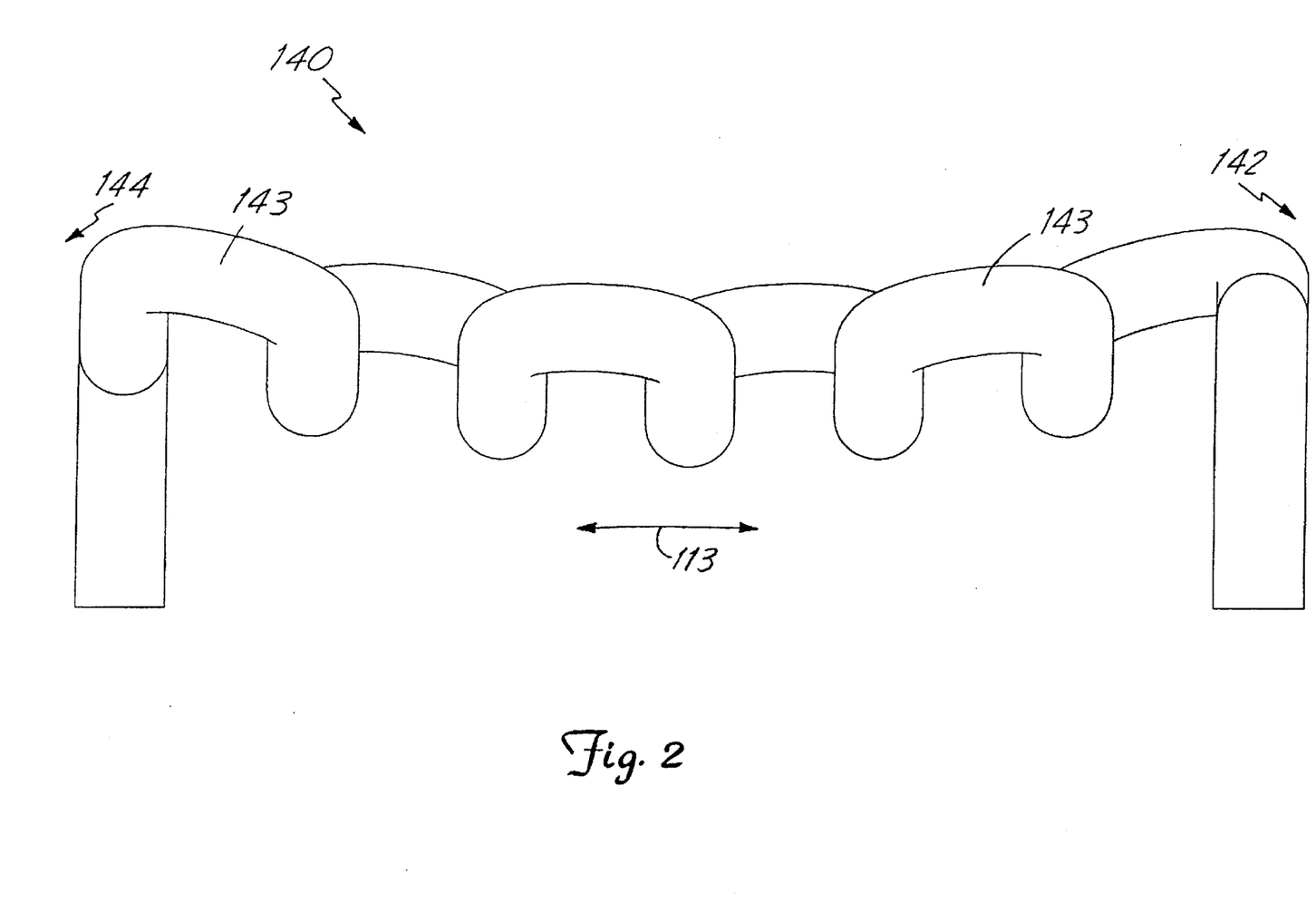
FIG. 2 is a side view of the non-planar fluorescent lamp illustrated in FIG. 1 and used in accordance with preferred luminaire embodiments of the present invention.

FIG. 2 is a side view of non-planar fluorescent lamp 140 illustrated in FIG. 1. As best illustrated in FIG. 2, lamp 140 is curved along direction 113 such that lamp sections 141 and junctions 143 on sides 142 and 144 are positioned closer to optical stack 110 or to the front of LCD 100 than are centrally located lamp sections or lamp section junctions. This in turn improves the viewing angle characteristics of LCD 100 when viewed off angle from sides 122 and 124.

Figure 3:
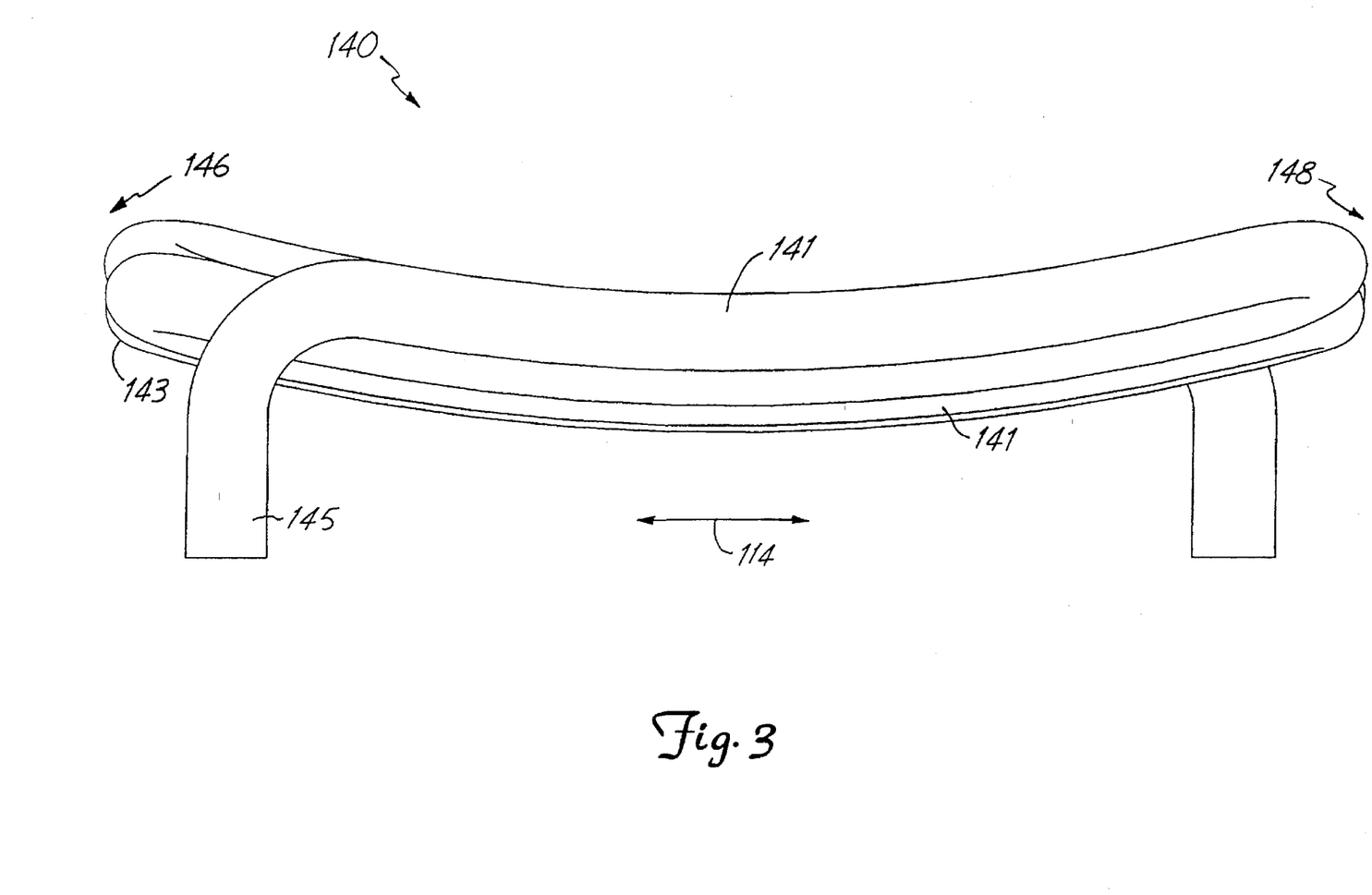
FIG. 3 is a top view of the non-planar fluorescent lamp illustrated in FIG. 2 and used in accordance with preferred luminaire embodiments of the present invention.

FIG. 3 is a top view of the non-planar fluorescent lamp illustrated in FIGS. 1 and 2. As best illustrated in FIG. 3, lamp 140 is curved along direction 114 such that lamp junctions 143 and portions of lamp sections 141 on sides 146 and 148 are positioned closer to optical stack 110 than are more centrally located portions of lamp sections 141. This in turn improves the viewing angle characteristics of LCD 100 when viewed off angle from sides 126 and 128.

LCD 100 is an improvement over conventional LCDs in that its luminaire design eliminates or greatly reduces edge effect, increases luminance uniformity and increases the mean luminance of the display. When assembled, portions of lamp 140 will be closer to optical stack 110 near sides 122, 124, 126 and 128 than at the center of the LCD. This allows an off-angle viewer to see more of the lamp's energy than is possible with a conventional planar grid lamp. In the embodiment illustrated in FIGS. 1–3, grid lamp 140 is formed such that the viewing angle characteristics of LCD 100 are improved for viewing from any of sides 122, 124, 126 and 128. However, in alternative embodiments, viewing angle characteristics for a specific viewing angle from a particular side of the display can be optimized. For example, if optimal viewing characteristics from side 126 are desired, grid lamp 140 can be curved toward optical stack 110 at side 128. Further, the arc along which lamp 140 is curved can be chosen so that the tangents to the curve are orthogonal to the line of sight of a viewer positioned at the desired viewing angle.

Figure 4:
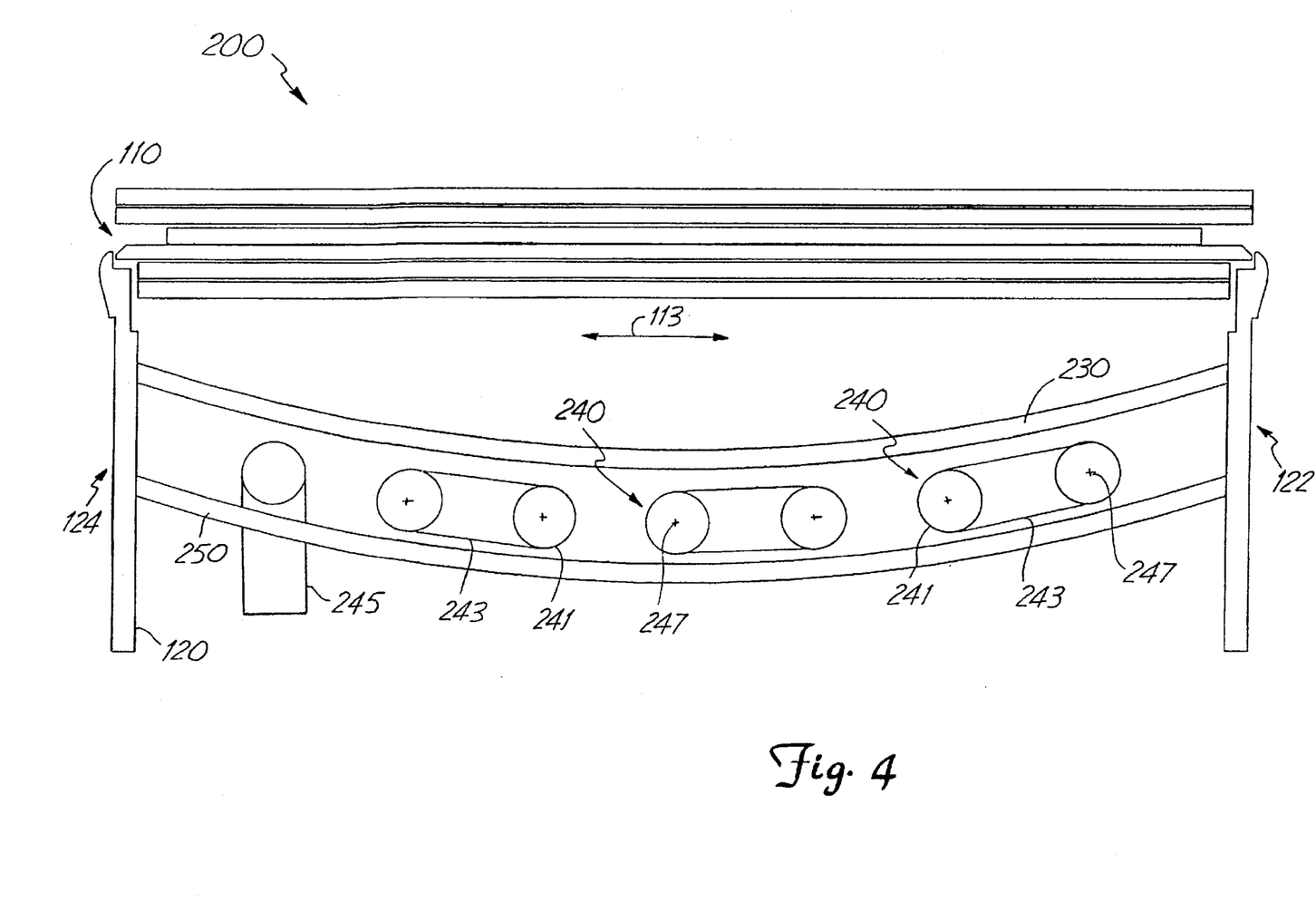
FIG. 4 is a diagrammatic side view of an LCD having a luminaire with a non-planar fluorescent lamp, a non-planar reflector, and a non-planar diffuser in accordance with second preferred embodiments of the present invention.

FIG. 4 is a diagrammatic side view of an LCD which illustrates an alternate embodiment of the luminaire or backlighting system. LCD 200 includes optical stack 110, frame 120, contoured diffuser 230, contoured grid lamp 240 and contoured reflector 250. As was the case with LCD 100 illustrated in FIG. 1, LCD 200 has four sides generally defined by the sides of frame 120. In the side view of FIG. 4, only sides 124 and 126 are shown. Preferably, LCD frame 120 has side wall treatment to limit optical losses due to absorption. This can be a high gloss white paint or a specular side wall. Diffuser 230 and reflector 250 are coupled or attached to the side walls of frame 120. Lamp 240 is positioned between diffuser 230 and reflector 250 and is secured in place by lamp sections 245 which protrude through apertures (not shown) in reflector 250 for connection to a rear portion of LCD 200.

LCD 200 is identical to LCD 100 illustrated in FIG. 1 except that diffuser 230, lamp 240 and reflector 250 are curved along only one direction. As shown, these components are curved along direction 113. With regards to lamp 240, the center 247 of each individual longitudinally extending ! amp section 241 maintains a substantially constant distance from optical stack 110 essentially throughout the lamp sections length. However, due to curvature along direction 113, the centers 247 of lamp sections 241 and junctions 243 near sides 122 and 124 of the display are closer to optical stack 110 than are centers 247 of lamp sections in the middle of the display. Providing curvature only along direction 113 reduces the complexity of the fabrication process, but only optimize the viewing angle performance when viewed off angle from sides 122 and 124. This tradeoff can be chosen, for example, when viewing is to be optimized for only a particular side or for only two oppositely oriented sides.

Figure 5:
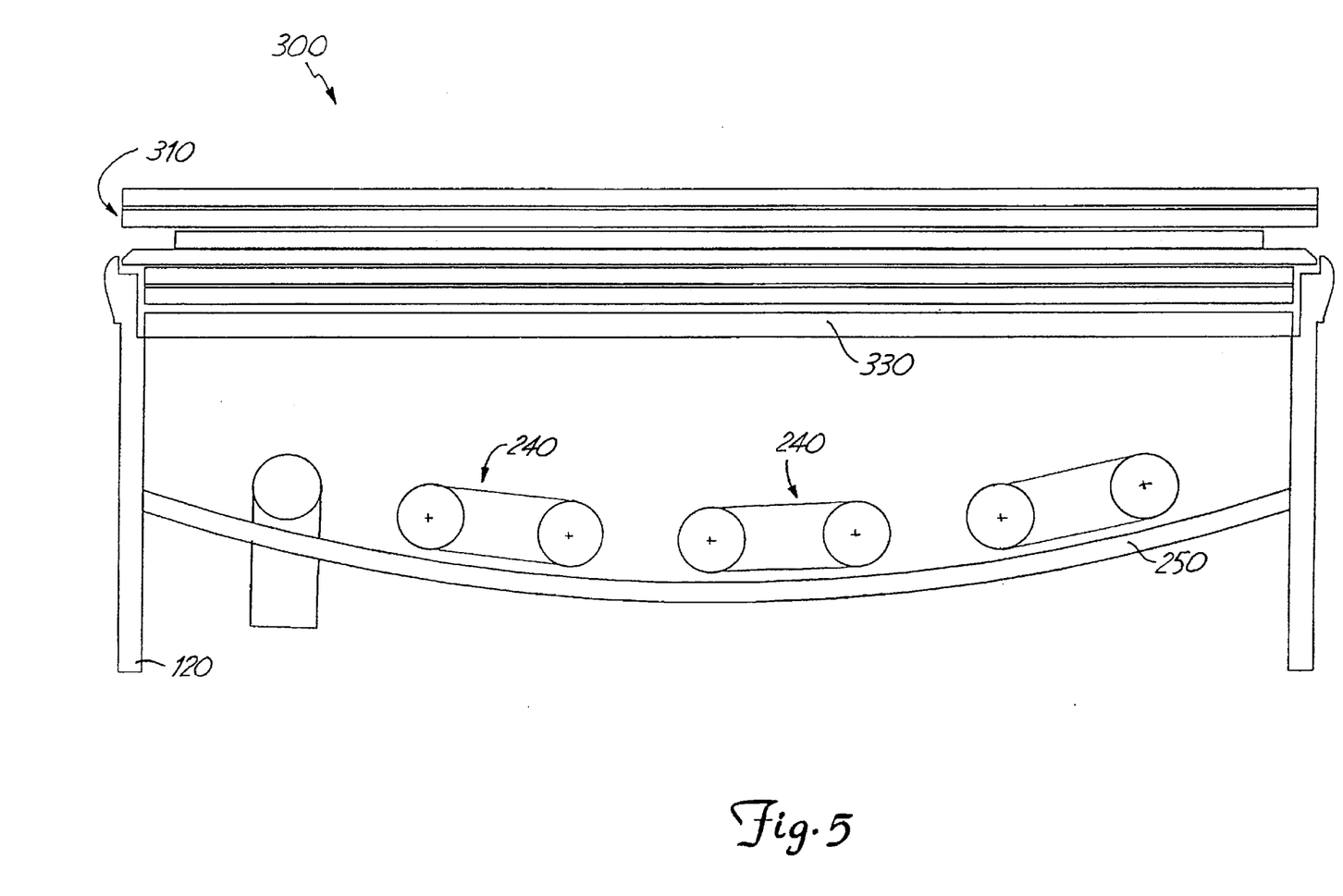
FIG. 5 is a diagrammatic side view with portions shown in section of an LCD having a luminaire with a non-planar fluorescent lamp and a non-planar reflector in accordance with third preferred embodiments of the present invention.

FIG. 5 is a diagrammatic side view of an LCD which illustrates yet another alternate embodiment of the luminaire or backlighting system of the present invention. LCD 300 includes frame 120, contoured grid lamp 240, contoured reflector 250, and optical stack 310. LCD 300 is identical to LCD 200 shown in FIG. 4 except that, instead of having a contoured diffuser, planar diffuser 330 is used and incorporated as part of optical stack 310. Using planar diffuser 330 instead of a contoured provides certain advantages such as reduced fabrication complexity and a resulting reduction in costs. However, a corresponding reduction in performance of LCD 300 may occur.

FIG. 5 is included to illustrate the fact that many alternate embodiments of the present invention exist and do not depart from the spirit of the invention. For example, it is clear that planar diffuser 330 can be used with a grid lamp such as lamp 140 (FIGS. 1–3) having curvature in more than one direction. Also, the grid lamp can be planar at one side and curved upward toward the optical stack at the opposite side in order to optimize the viewing angle characteristics for viewing from a single specific direction. Further, the present invention can be practiced by using multiple straight fluorescent lamps instead of a single serpentine fluorescent lamp. In this case, lamps closer to the sides of the LCD are positioned closer to the optical stack than lamps in the center of the LCD.

As shown in the embodiments illustrated in FIGS. 1–5, the curvature of the diffuser and/or the reflector are the same as the curvature of the grid lamp. However, it is not essential that the curvatures be identical. In fact, as stated above, one or both of the diffuser and the reflector can be planar while only the lamp has curvature. Many other such minor modifications of the present invention are possible.

Figure 6:
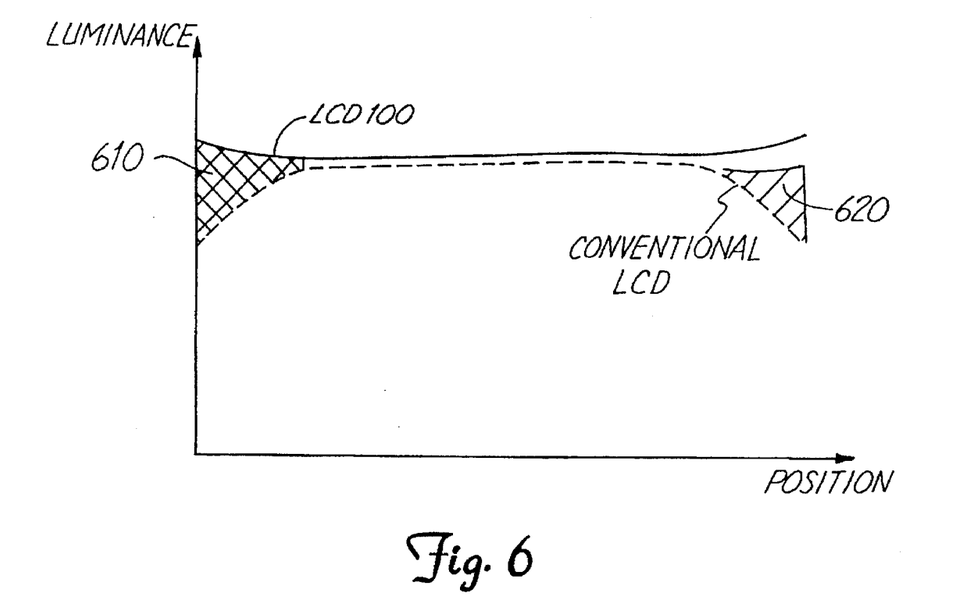
FIG. 6 is a graph which plots luminance versus position for a normal viewing angle to illustrate a first benefit of the present invention over prior art LCD luminaires.

FIG. 6 is a graph which illustrates benefits of the present invention by plotting the predicted luminance versus position, at normal viewing angle, for LCD 100 which incorporates the non-planar lamp design of the present invention and for a conventional LCD having a planar grid lamp. The luminance curve for the conventional LCD illustrates the phenomenon known as edge effect or luminance roll-off near the edges of the display. As discussed previously, this edge effect has a negative impact on viewing characteristics of the conventional LCD display at wide viewing angles. In contrast, the luminance of LCD 100 does not roll-off at the edges because the non-planar grid lamp design of the present invention provides an increase in luminance energy near the edges. Similar results will be obtained with any of the embodiments of the present invention. Area 610 (only a portion of area 610 is cross-hatched) between the luminance curves for LCD 100 and for a conventional LCD is indicative of the total luminance gained with the present invention by increasing flux in the corners and edges of the display. Areas 620 (only shown for one side of the display) illustrate the luminance lost in conventional LCDs due to edge/corner absorption of light.

Figure 7:
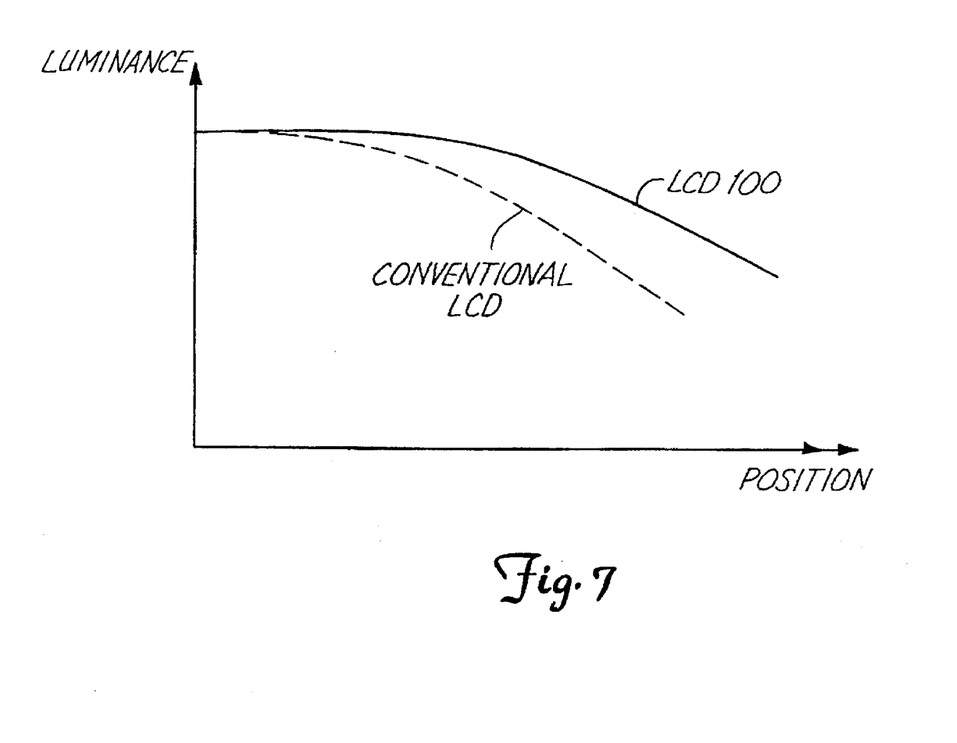
FIG. 7 is a graph which plots luminance versus position for a particular high viewing angle to illustrate a second benefit of the present invention over prior art LCD luminaires.

FIG. 7 is a graph which further illustrates benefits of the present invention by plotting the predicted luminance versus position, for a given wide viewing angle, for LCD 100 which incorporates the non-planar lamp design of the present invention and for a conventional LCD having a planar grid lamp. Note that the graph shown in FIG. 7 will differ somewhat for different viewing angles, but the benefits of the present invention are achieved over all viewing angles. FIG. 7 illustrates the luminance roll-off which occurs in conventional LCDs having planar grid lamps when viewing edge positions of the display from a wide viewing angle. By bringing more of the luminance energy of the lamp closer to the front of the display, LCD 100 of the present invention will decrease the luminance roll-off at these edge positions. A related advantage of the present invention is that the mean luminance of LCD 100 is increased over the mean luminance of conventional LCDs. This is illustrated by the fact that the area under the luminance versus position curve for LCD 100 is greater than the area under the luminance versus position curve for a conventional LCD. Similar results will be obtained with any of the embodiments of the present invention.

While particular embodiments of the present invention have been shown and described, it should be clear that changes and modifications may be made to such embodiments without departing from the true scope and spirit of the invention. It is intended that the appended claims cover all such changes and modifications.

I claim:

1. A liquid crystal display comprising:
   a liquid crystal matrix having a matrix periphery and a matrix central region;
   said matrix periphery including a matrix first side, a matrix second side, a matrix third side and a matrix fourth side;
   said matrix central region disposed interior of said matrix periphery, a lamp having a lamp periphery and a lamp central region;
   said lamp periphery including a lamp first side, a lamp second side, a lamp third side and a lamp fourth side;
   said lamp central region disposed interior of said lamp periphery; and,
   said lamp disposed about said matrix such that an average perpendicular distance measured from said matrix, around the matrix periphery, to the lamp is less than an average perpendicular distance from the matrix central region to the lamp.

2. A display of claim 1 wherein said liquid crystal matrix is planar and said lamp is non-planar.

3. A display of claim 1 wherein the lamp is a single lamp.

4. A display of claim 3 wherein the lamp is a fluorescent serpentine lamp.

5. A display of claim 1 further comprising a non-planar diffuser disposed between said lamp and said matrix.

6. A display of claim 1 wherein the lamp is concave in a direction toward said matrix.

7. A liquid crystal display comprising:

a planar liquid crystal matrix having a matrix periphery and a matrix central region;

said matrix periphery including a matrix first side, a matrix second side, a matrix third side and a matrix fourth side;

said matrix central region disposed interior of said matrix periphery, a concave serpentine fluorescent lamp having a lamp periphery and a lamp central region;

said lamp periphery including a lamp first side, a lamp second side, a lamp third side and a lamp fourth side;

said lamp central region disposed interior of said lamp periphery;

said lamp disposed about said matrix such that an average perpendicular distance measured from said matrix, around the matrix periphery, to the lamp is less than an average perpendicular distance from the matrix central region to the lamp; and, a non-planar diffuser disposed between the lamp and the matrix.

* * * * *